United States Patent
Jang et al.

(10) Patent No.: US 12,456,226 B2
(45) Date of Patent: Oct. 28, 2025

(54) METHOD AND APPARATUS WITH IMAGE TRANSFORMATION

(71) Applicant: Samsung Electronics Co., Ltd., Suwon-si (KR)

(72) Inventors: Dongwon Jang, Seoul (KR); Dokwan Oh, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 303 days.

(21) Appl. No.: 17/679,492

(22) Filed: Feb. 24, 2022

(65) Prior Publication Data

US 2023/0007964 A1 Jan. 12, 2023

(30) Foreign Application Priority Data

Jul. 12, 2021 (KR) ........................ 10-2021-0090668

(51) Int. Cl.
*G06T 7/90* (2017.01)

(52) U.S. Cl.
CPC ...... *G06T 7/90* (2017.01); *G06T 2207/20084* (2013.01)

(58) Field of Classification Search
CPC ............ G06T 7/90; G06T 2207/20084; G06V 10/772; G06V 10/774; G06V 10/82; G06V 20/56; H04N 1/6077; H04N 1/6019; H04N 9/73; G06N 3/08
See application file for complete search history.

(56) References Cited

U.S. PATENT DOCUMENTS

| | | | |
|---|---|---|---|
| 10,275,473 B2 | 4/2019 | Kim et al. | |
| 10,769,492 B2 | 9/2020 | Kim et al. | |
| 10,852,379 B2 | 12/2020 | Chen et al. | |
| 2018/0314716 A1* | 11/2018 | Kim | G06T 1/20 |
| 2020/0074223 A1* | 3/2020 | Cho | G06F 18/214 |

FOREIGN PATENT DOCUMENTS

| | | | | |
|---|---|---|---|---|
| CN | 106791756 A | * | 5/2017 | ............... H04N 9/64 |
| CN | 111127336 A | * | 5/2020 | ........... G06K 9/6256 |
| KR | 10-2020-0093424 A | | 8/2020 | |
| KR | 10-2166016 B1 | | 10/2020 | |

(Continued)

OTHER PUBLICATIONS

Liang, Zhetong, et al. "Cameranet: A two-stage framework for effective camera isp learning." IEEE Transactions on Image Processing 30 (2021): 2248-2262. (Year: 2021).*

(Continued)

*Primary Examiner* — Amandeep Saini
*Assistant Examiner* — Denise G Alfonso
(74) *Attorney, Agent, or Firm* — NSIP Law

(57) ABSTRACT

A method with image transformation includes: identifying an original image; and determining a transformed image by inputting the original image to a neural network model configured to transform a color of the original image, wherein the neural network model comprises an operation block configured to perform white balancing on the original image, a correction block configured to correct a color of an output image of the operation block, and a mapping block configured to apply a lookup table to an output image of the correction block.

15 Claims, 6 Drawing Sheets

(56) References Cited

FOREIGN PATENT DOCUMENTS

KR  10-2192211 B1  12/2020
KR  10-2248150 B1  5/2021

OTHER PUBLICATIONS

Wang, Chaoyue, et al. "Perceptual adversarial networks for image-to-image transformation." IEEE Transactions on Image Processing 27.8 (2018): 4066-4079. (Year: 2018).*

Wang, Xiaolong, and Abhinav Gupta. "Generative image modeling using style and structure adversarial networks." European conference on computer vision. Cham: Springer International Publishing, 2016. (Year: 2016).*

Zhang, Ling, et al. "CLA-GAN: A Context and Lightness Aware Generative Adversarial Network for Shadow Removal." Computer Graphics Forum. vol. 39. No. 7. 2020. (Year: 2020).*

Liu, Chengxu, et al. "4D LUT: learnable context-aware 4d lookup table for image enhancement." IEEE Transactions on Image Processing 32 (2023): 4742-4756. (Year: 2023).*

Ratnasingam, Sivalogeswaran. "Deep camera: A fully convolutional neural network for image signal processing." Proceedings of the IEEE/CVF International Conference on Computer Vision Workshops. 2019. (Year: 2019).*

Yi, Zili, et al. "Dualgan: Unsupervised dual learning for image-to-image translation." Proceedings of the IEEE international conference on computer vision. 2017. (Year: 2017).*

Qu, Xuexin, et al. "Perceptual-DualGAN: perceptual losses for image to image translation with generative adversarial nets." 2018 International Joint Conference on Neural Networks (IJCNN). IEEE, 2018. (Year: 2018).*

Hwang, Youngbae, et al. "Color Transfer Using Probabilistic Moving Least Squares." *Proceedings of the IEEE conference on computer vision and pattern recognition* 2014 (8 pages in English).

Zhu, Jun-Yan, et al. "Unpaired Image-to-Image Translation Using Cycle-Consistent Adversarial Networks." *Proceedings of the IEEE international conference on computer vision* 2017 (10 pages in English).

Liu, Ming-Yu, et al. "Unsupervised Image-to-Image Translation Networks." *Advances in neural information processing systems* vol. 30 2017 (9 pages in English).

Yang, Yanchao, et al. "Phase Consistent Ecological Domain Adaptation." *Proceedings of the IEEE/CVF Conference on Computer Vision and Pattern Recognition* 2020 (10 pages in English).

* cited by examiner

METHOD AND APPARATUS WITH IMAGE TRANSFORMATION

CROSS-REFERENCE TO RELATED APPLICATIONS

This application claims the benefit under 35 USC § 119(a) of Korean Patent Application No. 10-2021-0090668, filed on Jul. 12, 2021 in the Korean Intellectual Property Office, the entire disclosure of which is incorporated herein by reference for all purposes.

BACKGROUND

1. Field

The following description relates to a method and apparatus with image transformation using a neural network.

2. Description of Related Art

Neural network models may be applied to various technical fields. For example, a neural network model may be applied to various types of computer vision technology including image segmentation, image recognition, object detection, and depth estimation.

To train a neural network model to have high performance, various types of training data may be used. When there is a domain difference caused by a seasonal difference or a camera characteristic, performance of the neural network model may be degraded even with the same image, and thus training data in a plurality of domains may not be directly collected. Thus, color transformation may be performed on an image.

Color transformation may be performed on an image by optimizing a probability of a color between an original image and a reference image. According to "Color Transfer Using a Probabilistic Moving Least Squares" presented at a conference on computer vision and pattern recognition (CVPR) in 2014, a computational complexity may increase because a reference image is needed, and an issue of optimization needs to be resolved every time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method with image transformation includes: identifying an original image; and determining a transformed image by inputting the original image to a neural network model configured to transform a color of the original image, wherein the neural network model comprises an operation block configured to perform white balancing on the original image, a correction block configured to correct a color of an output image of the operation block, and a mapping block configured to apply a lookup table to an output image of the correction block.

The operation block may include a depth-wise convolution layer configured to perform white balancing through a channel-wise operation on a color of each of pixels comprised in the original image.

The correction block may include a convolution layer configured to perform an operation on colors of pixels comprised in the output image of the operation block, a batch normalization layer configured to perform batch normalization on the output image of the operation block, and an activation layer configured to perform an activation function operation.

The mapping block may include a plurality of residual blocks configured to transform the color of the output image of the correction block based on a preset function of the neural network model by applying the lookup table to the output image of the correction block.

The method may include: generating a comparison image using a comparison model trained to generate an image the same as the original image from the transformed image; and training the neural network model based on a difference between the original image and the comparison image, wherein the comparison model is a deep learning model that is different from the neural network model and has a same structure as the neural network model.

The method may include training the neural network model to generate the transformed image that is not discriminated by a discriminative model trained to discriminate an original image and a transformed image generated from the neural network model.

In another general aspect, one or more embodiments include a non-transitory computer-readable storage medium storing instructions that, when executed by a processor, configure the processor to perform any one, any combination, or all operations and methods described herein.

In another general aspect, an apparatus with image transformation includes: a processor configured to: identify an original image; and determine a transformed image by inputting the original image to a neural network model configured to transform a color of the original image, wherein the neural network model may include an operation block configured to perform white balancing on the original image, a correction block configured to correct a color of an output image of the operation block, and a mapping block configured to apply a lookup table to an output image of the correction block.

The operation block may include a depth-wise convolution layer configured to perform white balancing through a channel-wise operation on a color of each of pixels comprised in the original image.

The correction block may include a convolution layer configured to perform an operation on colors of pixels comprised in the output image of the operation block, a batch normalization layer configured to perform batch normalization on the output image of the operation block, and an activation layer configured to perform an activation function operation.

The mapping block may include a plurality of residual blocks configured to transform the color of the output image of the correction block based on a preset function of the neural network model by applying the lookup table to the output image of the correction block.

The processor may be configured to: generate a comparison image using a comparison model trained to generate an image the same as the original image from the transformed image; and train the neural network model based on a difference between the original image and the comparison image, wherein the comparison model is a deep learning model that is different from the neural network model and has a same structure as the neural network model.

The processor may be configured to train the neural network model to generate the transformed image that is not discriminated by a discriminative model trained to discriminate an original image and a transformed image generated from the neural network model.

In another general aspect, a method with image transformation includes: generating, using a first generation model, a first transformed image based on a first original image; generating, using a second generation model, a second transformed image based on the first transformed image; and training the first generation model based on a reconstruction loss determined based on the first original image and the second transformed image, and based on an adversarial loss determined based on a second original image and the first transformed image.

The training of the first generation model based on the adversarial loss may include updating one or more parameters of the first generation model based on a difference in a brightness of the first transformed image and a brightness of the second original image.

The training of the first generation model based on the adversarial loss may include: determining, using a first discriminative model trained using the second original image, the adversarial loss based on the first transformed image; and updating one or more parameters of the first generation model in response to the adversarial loss being greater than or equal to a preset threshold value.

The first original image, the first transformed image, and the second transformed image may be of a same scene, the generating of the first transformed image may include one of increasing or decreasing a brightness level of the first original image, and the generating of the second transformed image may include the other one of increasing or decreasing a brightness level of the first transformed image.

The first generation model may be a neural network model comprising an operation block configured to perform white balancing on the first original image, a correction block configured to correct a color of an output image of the operation block, and a mapping block configured to apply a lookup table to an output image of the correction block.

Other features and aspects will be apparent from the following detailed description, the drawings, and the claims.

Figure 1:
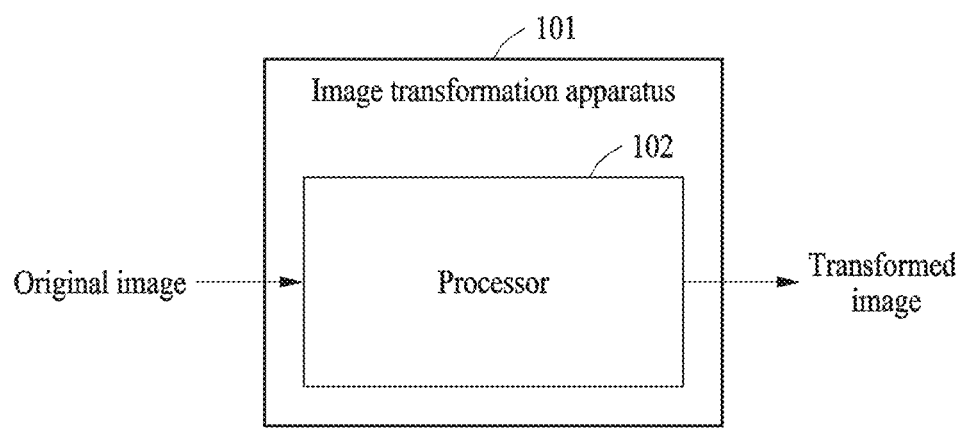
FIG. 1 illustrates an example of an image transformation apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (e.g., as to what an example or embodiment may include or implement) means that at least one example or embodiment exists where such a feature is included or implemented, while all examples are not limited thereto.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, each of expressions, for example, "between" and "immediately between" and "adjacent to" and "immediately adjacent to," should also be respectively construed in the same way. As used herein, the term "and/or" includes any one and any combination of any two or more of the associated listed items. The use of the term "may" herein with respect to an example or embodiment (e.g., as to what an example or embodiment may include or implement) means that at least one example or embodiment exists where such a feature is included or implemented, while all examples are not limited thereto.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of an image transformation apparatus.

In an example, a neural network model that simulates or performs operations of an image processing apparatus (or an image signal processor) may be used to transform a color of an original image at low cost and such that a transformed image has high quality. A color transformation may be performed on the original image according to various examples described herein. The original image may be transformed into transformed images of various domains, and the transformed images may be used to train a neural network model that performs image recognition or object detection to improve the performance of the neural network model.

Example embodiments described herein may be applied to various types of computer vision technology including, for example, image segmentation, image recognition, object detection, and/or depth estimation, and be thus used in various fields such as, for example, autonomous driving (AD), advanced driving assistance systems (ADAS), in-vehicle infotainment (IVI), and surround view monitor (SVM).

The operations of the image processing apparatus may be operations to process images collected by the image processing apparatus and include white balancing, color correction, and non-linear tone mapping, and the like.

Referring to FIG. 1, an image transformation apparatus 101 may include a processor 102 (e.g., one or more processors). The processor 102 of the image transformation apparatus 101 may perform an image transformation method described herein. In an example, operations of a neural network model may be performed by the processor 102 of the image transformation apparatus 101.

The processor 102 may generate a transformed image of which a color is transformed from an original image using the neural network model. The neural network model used herein may be trained based on a training image without a corresponding correct answer label or target image (e.g., unsupervised learning). A non-limiting example of a structure of the neural network model will be described hereinafter with reference to FIG. 2.

Figure 2:
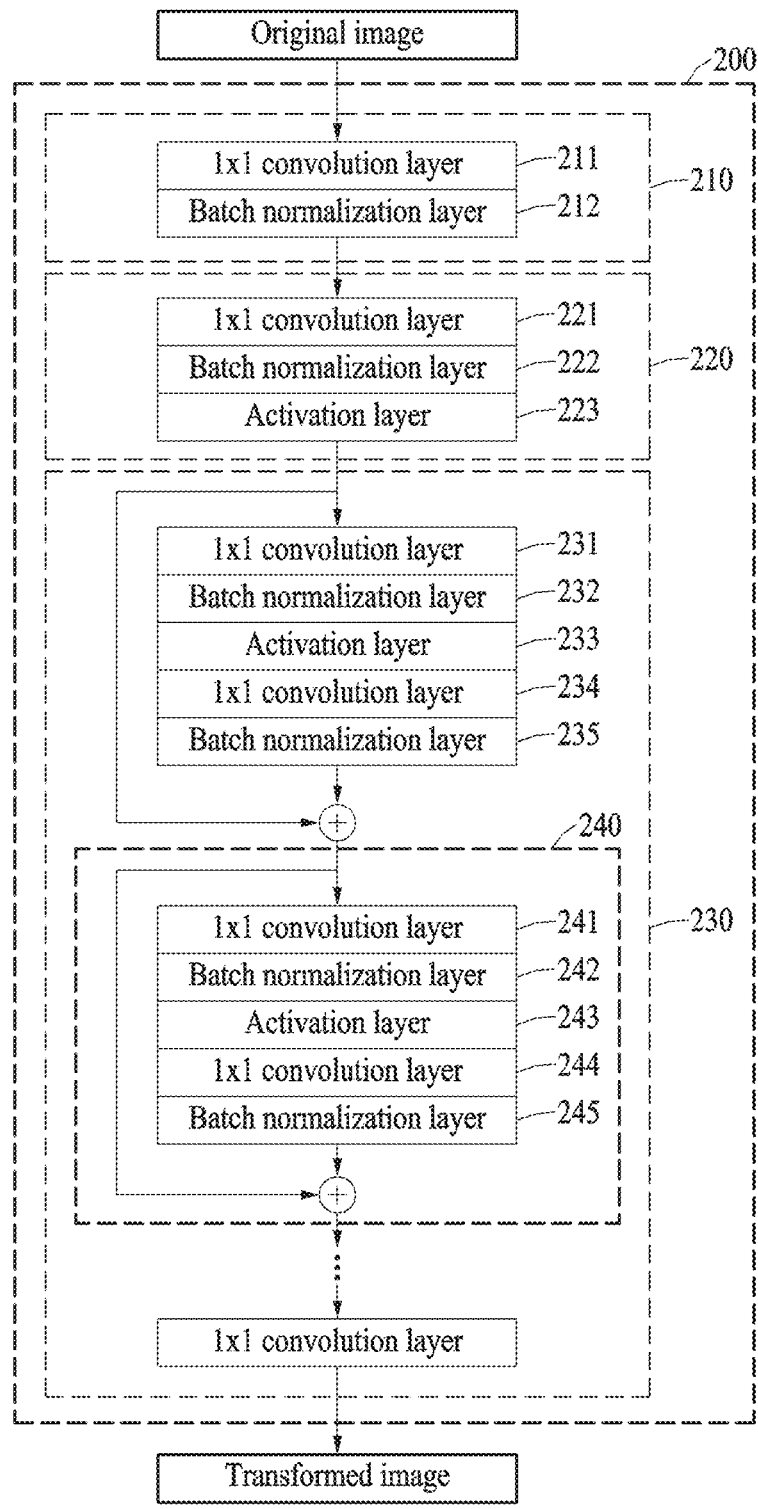
FIG. 2 illustrates an example of a structure of a neural network model.

FIG. 2 illustrates an example of a structure of a neural network model.

A neural network model 200 may include an operation block 210 for performing white balancing on an original image, a correction block 220 for correcting a color of an output image of the operation block 210, and a mapping block 230 for applying a lookup table to an output image of the correction block 220.

The operation block 210 may be a block for performing an operation that simulates or performs a white balancing operation in image processing and may include a depth-wise convolution layer 211 for performing white balancing through a channel-wise operation on a color of each of pixels included in the original image and a batch normalization layer 212. A color channel of each pixel may be one of red (R), green (G), and blue (B). The operation block 210 may perform white balancing by multiplying a weight through each channel on the color of each of the pixels included in the original image. In an example, an operation, as represented by Equation 1 below, for example, may be performed in the depth-wise convolutional layer 211.

$$\begin{bmatrix} \hat{R} \\ \hat{G} \\ \hat{B} \end{bmatrix} = \begin{bmatrix} w_R & 0 & 0 \\ 0 & w_G & 0 \\ 0 & 0 & w_B \end{bmatrix} \begin{bmatrix} R \\ G \\ B \end{bmatrix} \quad \text{Equation 1}$$

In Equation 1, $\hat{R}$, $\hat{G}$, and $\hat{B}$ denote, respectively, an R value, a G value, and a B value that are obtained by multiplying a weight. R, G, and B denote color channels of each of pixels included in the original image. $W_R$, $W_G$, and $W_B$ denote weights used for a channel-wise operation.

The depth-wise convolutional layer 211 may be a convolutional layer of a 1×1 kernel size. When the kernel size is 1×1, a transposed convolution operation may not be performed (e.g., the output image of the operation block 210 may be generated without performing the transposed convolution operation), and thus a regular noise such as an artifact may not occur.

The correction block 220 may be a block for performing an operation that simulates or performs a color correction operation in image processing and may include a convolution layer 221 for performing an operation between a color of each of pixels included in an output image of the operation block 210, a batch normalization layer 222 for performing batch normalization on an output image of the operation block 210, and an activation layer 223 for performing an operation for an activation function. The activation function used in the activation layer 223 may be, for example, a rectified linear unit (ReLU).

The convolutional layer 221 may be a layer of a 1×1 kernel size. When the kernel size is 1×1, a transposed convolution operation may not be performed (e.g., the output image of the operation block 220 may be generated without performing the transposed convolution operation), and thus a regular noise such as an artifact may not occur.

The correction block 220 may perform color correction by calculating a weighted sum between color channels of pixels included in the output image of the operation block 210. In an example, an operation, as represented by Equation 2 below, for example, may be performed in the convolutional layer 221.

$$\begin{bmatrix} \hat{R} \\ \hat{G} \\ \hat{B} \end{bmatrix} = \begin{bmatrix} w_{RR} & w_{RG} & w_{RB} \\ w_{GR} & w_{GG} & w_{GB} \\ w_{BR} & w_{BG} & w_{BB} \end{bmatrix} \begin{bmatrix} R \\ G \\ B \end{bmatrix} \quad \text{Equation 2}$$

In Equation 2, $\hat{R}$, $\hat{G}$, and $\hat{B}$ denote, respectively, an R value, a G value, and a B value that are obtained by multiplying a weight. R, G, and B denote color channels of each of pixels included in the output image of the operation block 210. $W_{RR}$, $W_{GG}$, $W_{BB}$, $W_{RG}$, $W_{GR}$, $W_{BR}$, $W_{RB}$, $W_{GB}$, and $W_{BG}$ denote weights used for a weighted sum operation.

The mapping block 230 may include a plurality of residual blocks 240 for transforming a color of the output image of the correction block 220 based on a preset purpose (e.g., a preset function or operation) of the neural network model 200 by applying a lookup table to an output image of the correction block 220.

Each of the residual blocks 240 may include a convolutional layer 241, a batch normalization layer 242, an activation layer 243, a convolution layer 244, and a batch normalization layer 245. The convolutional layer 241 may be a layer of a 1×1 kernel size. For example, an activation function used in the activation layer 243 may be a ReLU.

In an example, of image processing operations, operations used to apply a three-dimensional (3D) lookup table and a one-dimensional (1D) tone curve may be performed in the residual blocks 240. Through the residual blocks 240, a color of a pixel included in the output image of the correction block 220 may be transformed to be emphasized.

Figure 3:
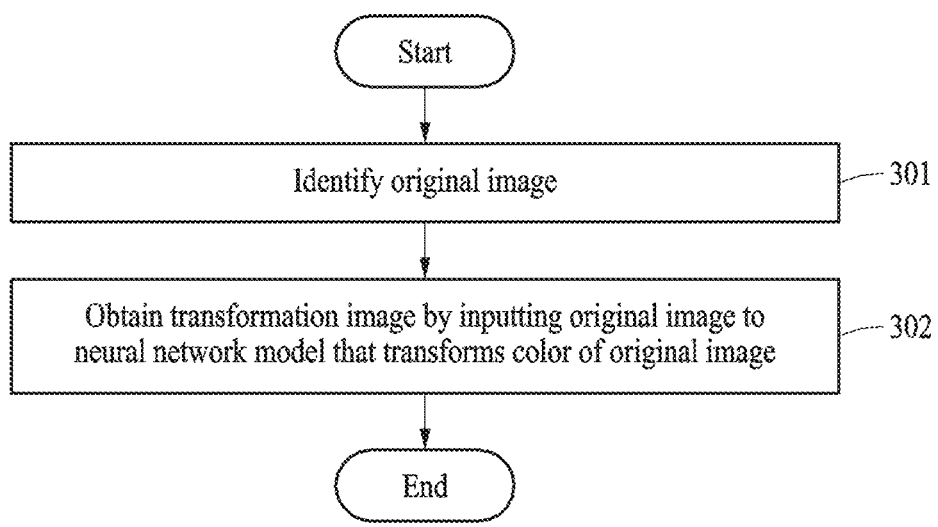
FIG. 3 illustrates an example of an image transformation method.

FIG. 3 illustrates an example of an image transformation method.

In operation 301, a processor of an image transformation apparatus (e.g., the processor 102) may identify an original image. In operation 302, the processor may obtain a transformed image by inputting the original image to a neural network model for transforming a color of the original image. The neural network model may be trained to transform the color of the original image. The transformed image may be an image having a color transformed from that of the original image by the neural network model.

The neural network model may include an operation block for performing white balancing on the original image (e.g., the operation block 210), a correction block for correcting a color of an output image of the operation block (e.g., the operation block 220), and a mapping block for applying a lookup table to an output image of the correction block (e.g., the operation block 230).

Figure 4:
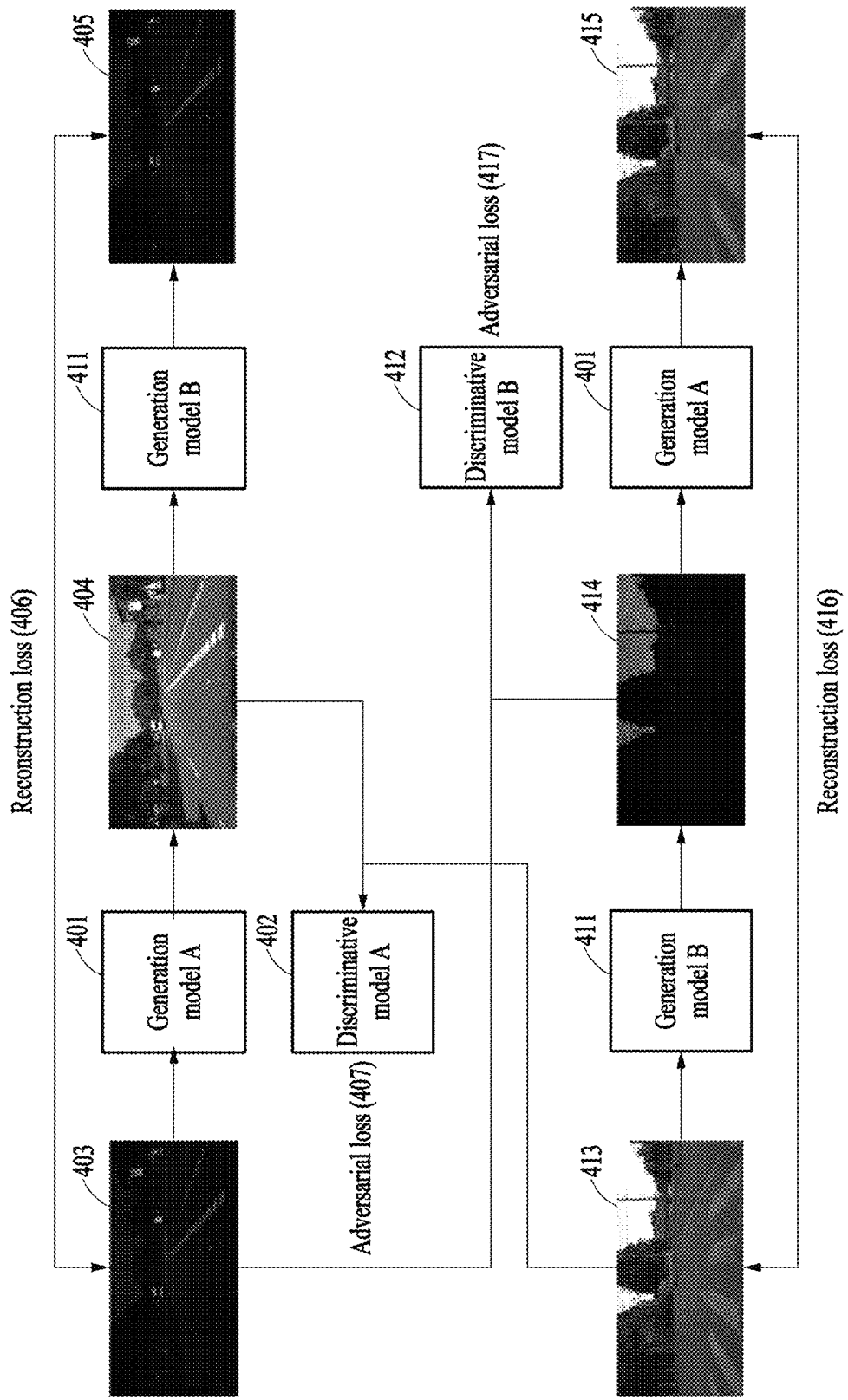
FIG. 4 illustrates an example of training a neural network model.

FIG. 4 illustrates an example of training a neural network model.

A processor of an image transformation apparatus (e.g., the processor 102) may generate comparison images (e.g., images 405 and 415) from transformed images 404 and 414 using a comparison model trained to generate images the same as original images 403 and 413 from the transformed images 404 and 414 and train a neural network model based on a difference between the original images 403 and 413 and the comparison images.

The comparison model may be a deep learning model that is different from the neural network model and may have the same structure as the neural network model. The comparison model may be a model with a purpose or one or more operations opposite to that of the neural network model. For example, the neural network model may be trained to darkly transform the original images 403 and 413, and the comparison model may be trained to brightly transform the original images 403 and 413. The comparison model may also have the same structure as the neural network model described herein.

Referring to FIG. 4, a generation model A 401 may be a model having the same structure as the neural network model described herein and may brightly transform the original images 403 and 413 (e.g., the generation model A 401 may transform the original images 403 and 413 to generate images with increased brightness compared to the original images 403 and 413). A generation model B 411 may be a comparison model having the same structure as the neural network model described herein and darkly transform the original images 403 and 413 (e.g., the generation model B 411 may transform the original images 403 and 413 to generate images with decreased brightness compared to the original images 403 and 413).

In an example, the training may be performed through unsupervised learning, and thus target data may not be present. The processor of the image transformation apparatus may generate the comparison images from the transformed images 404 and 414 using the comparison model trained to generate the images the same as the original images 403 and 413 from the transformed images 404 and 414 and train the neural network model based on the difference between the original images 403 and 413 and the comparison images.

Referring to FIG. 4, a transformed image 405 may be obtained by inputting a transformed image 404 (generated by the generation model A 401 that brightly transforms the color of an original image 403) to the generation model B 411 which is a comparison model that darkly transforms the color. When the generation model A 401 and the generation model B 411 operate normally or accurately, the original image 403 and the transformed image 405 may be nearly the same. The processor may determine a reconstruction loss 406 based on a difference between the original image 403 and the transformed image 405. The processor may train the neural network model (e.g., the generation model A 401) to minimize the reconstruction loss 406.

The processor may train the neural network model to generate the transformed image 404 that is not discriminated by a discriminative model trained to discriminate an original image 413 from the transformed image 404 generated from the neural network model.

Referring to FIG. 4, a discriminative model A 402 may also be referred to as a discriminator model that is trained to discriminate whether images are bright images. The processor may train the discriminative model A 402 based on a difference between a result of the discriminating by the discriminative model A 402 and a correct answer label. The correct answer label may include a label indicating whether an input image is a bright image. The discriminative model A 402 may be trained through supervised learning. The original image 413 determined as a bright image by a user may be used to train the discriminative model A 402.

When the transformed image 404 generated by the generation model A 401 is discriminated by the trained discriminative model A 402, the processor may train the generation model A 401 by updating a parameter of the generation model A 401. That is, the processor may train the generation model A 401 by updating the parameter of the generation model A 401 until the transformed image 404 generated by the generation model A 401 is nearly the same as an actual bright image (e.g., until a difference in a brightness of the transformed image 404 and a brightness of the original images 413 is less than or equal to a preset threshold value) and the transformed image 404 is thus no longer discriminated by the discriminative model A 402. The processor may determine an adversarial loss 407 based on a difference between the original image 413 and the transformed image 404. The processor may train the generation model A 401 to minimize the adversarial loss 407.

Referring to FIG. 4, the generation model B 411 may darkly transform the original image 413. Referring to FIG. 4, a transformed image 415 may be obtained by inputting a transformed image 414 (generated by the generation model B 411 that darkly transforms the color for the original image 413) to the generation model A 401 which is a comparison model that brightly transforms the color. When the generation model A 401 and the generation model B 411 operate normally or accurately, the original image 413 and the transformed image 415 may be nearly the same. The processor may determine a reconstruction loss 416 based on a difference between the original image 413 and the transformed image 415. The processor may train the generation model B 411 to minimize the reconstruction loss 416.

The processor may train the neural network model to generate the transformed image 414 that is not discriminated by a discriminative model trained to discriminate the original image 403 from the transformed image 414 generated from the neural network model.

Referring to FIG. 4, a discriminative model B 412 may also be referred to as a discriminator model that is trained to discriminate whether images are dark images. The processor may train the discriminative model B 412 based on a difference between a result of the discriminating by the discriminative model B 412 and a correct answer label. The correct answer label may include a label indicating whether an input image is a bright image. The discriminative model B 412 may be trained through supervised learning. The original image 413 determined as a bright image by the user may be used to train the discriminative model B 412.

When the transformed image 414 generated by the generation model B 411 is discriminated by the trained discriminative model B 412, the processor may train the generation model B 411 by updating a parameter of the generation model B 411. That is, the processor may train the generation model B 411 by iteratively updating the parameter of the generation model B 411 until the transformed image 414 generated by the generation model B 411 is nearly the same as an actual dark image (e.g., until a difference in a brightness of the transformed image 414 and a brightness of the original images 403 is less than or equal to a preset threshold value) and the transformed image 414 is thus no longer discriminated by the discriminative model B 411. The processor may determine an adversarial loss 417 based on a difference between the original image 403 and the transformed image 414. The processor may train the generation model B 411 to minimize the adversarial loss 417.

A method of training the neural network model may not be limited to the foregoing example, and various types of methods using the structure of the neural network model of FIG. 2 may be applied to the training.

Weights to be used for the neural network model may be learned or trained differently based on a purpose of the neural network model. For example, weights or operation representations may be set differently for a neural network model that darkly transforms the original image 413 (e.g., the generation model B 411) and for a neural network model that brightly transforms the original image 403 (e.g., the generation model A 401). For another example, the purpose of the neural network model may be to apply a weather condition (e.g., cloudy, sunny, etc.) to an original image or to emphasize a color impression in the original image.

Figure 5:
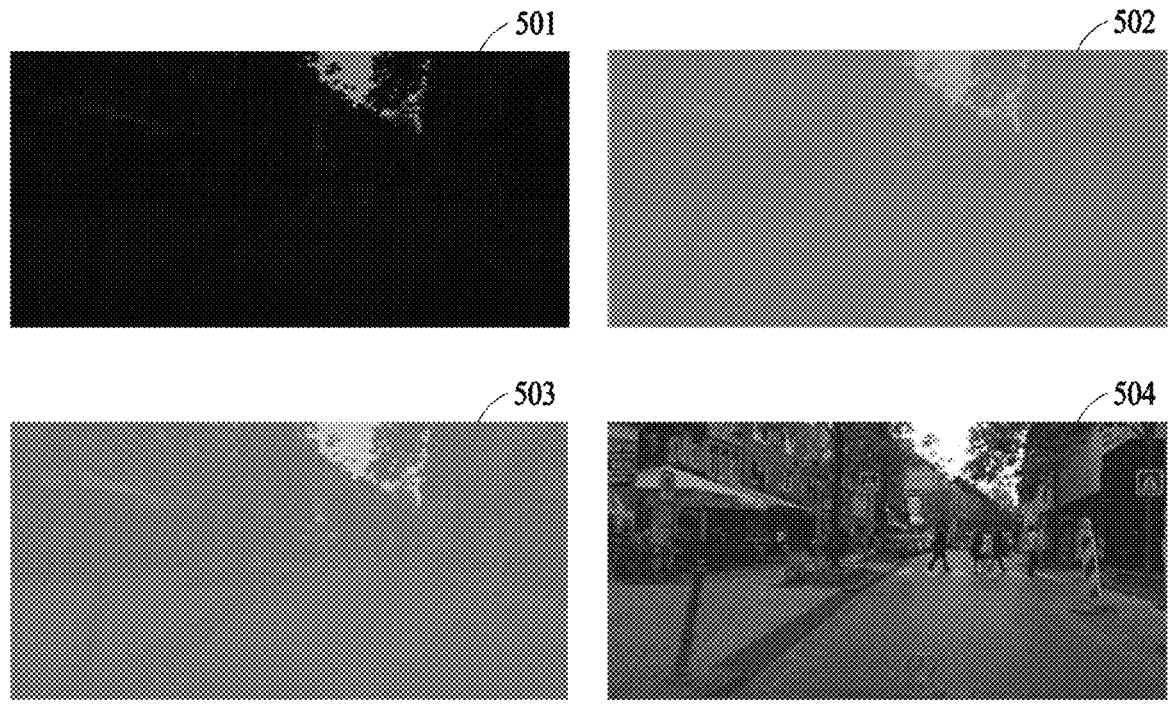
FIG. 5 illustrates examples of images transformed by a neural network model.

FIG. 5 illustrates examples of images transformed by a neural network model.

A neural network model to be described hereinafter with reference to FIG. 5 may be a model trained to transform an original image into a bright image. Image 501 of FIG. 5 may be an original image which is a target is to be transformed. Image 502 of FIG. 5 may be an original image obtained by performing white balancing. Image 502 of FIG. 5 may also be the original image obtained by performing white balancing by an operation block.

Image 503 of FIG. 5 may be an image obtained by performing color correction by a correction block. Image 504 of FIG. 5 may be an image obtained by applying a lookup table by a mapping block. In actual implementation, the images 502 and 503 may not be output in an implementation process. The mapping block may include a plurality of residual blocks for applying a lookup table. In the residual blocks, operations for applying the lookup table may be processed.

Figure 6:
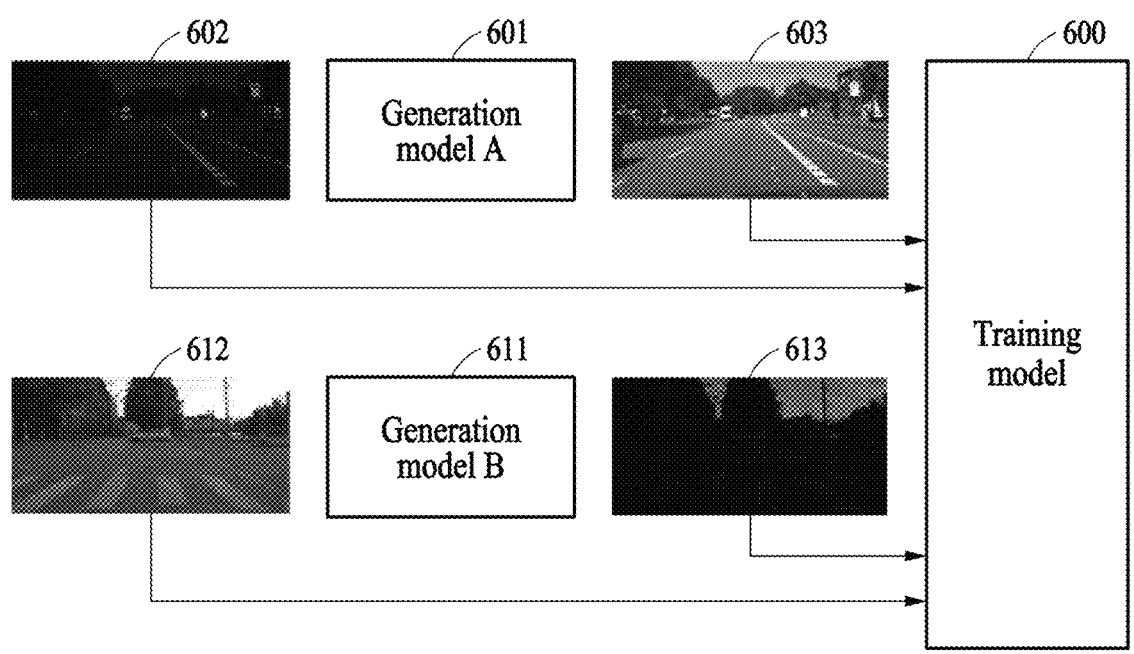
FIG. 6 illustrates examples of applying a neural network model.

FIG. 6 illustrates examples of applying a neural network model.

According to example embodiments described herein, an original image may be transformed into transformed images of various domains, and the transformed images may be used to train a training model 600 that performs image recognition or object detection to improve the performance of the training model.

In an example, even when an original image 602 is present only as an image in a dark domain, a transformed image 603 generated by a generation model A described herein may be used as training data for the training model 600. In addition, even when an original image 612 is present only as an image in a bright domain, a transformed image 613 generated by a generation model B described herein may be used as training data for the training model 600.

According to example embodiments described herein, domain adaptation may facilitate training of various types of training models. The training models may be used in fields that need domain adaptation, such as, for example, AD, ADAS, IVI, and SVM.

The image transformation apparatuses, processors, image transformation apparatus 101, processor 102, and other apparatuses, devices, units, modules, and components described herein with respect to FIGS. 1 through 6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 through 6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A method with image transformation, comprising:
   identifying an original image; and
   determining a transformed image by inputting the original image to a neural network model configured to transform a color of the original image,
   wherein the neural network model comprises an operation block configured to perform white balancing on the original image using a convolution layer of a 1×1 kernel size, a correction block configured to correct a color of an output image of the operation block, and a mapping block comprising a plurality of residual blocks configured to apply a lookup table to an output image of the correction block.

2. The method of claim 1, wherein the operation block comprises a depth-wise convolution layer, as the convolution layer, configured to perform white balancing through a channel-wise operation on a color of each of pixels comprised in the original image.

3. The method of claim 1, wherein the correction block comprises a convolution layer configured to perform an operation on colors of pixels comprised in the output image of the operation block, a batch normalization layer configured to perform batch normalization on the output image of the operation block, and an activation layer configured to perform an activation function operation.

4. The method of claim 1, wherein the plurality of residual blocks are configured to transform the color of the output image of the correction block based on a preset function of the neural network model by applying the lookup table to the output image of the correction block.

5. The method of claim 1, further comprising:
   generating a comparison image using a comparison model trained to generate an image the same as the original image from the transformed image; and
   training the neural network model based on a difference between the original image and the comparison image,
   wherein the comparison model is a deep learning model that is different from the neural network model and has a same structure as the neural network model.

6. The method of claim 1, further comprising:
training the neural network model to generate the transformed image that is not discriminated by a discriminative model trained to discriminate an original image and a transformed image generated from the neural network model.

7. A non-transitory computer-readable storage medium storing instructions that, when executed by a processor, configure the processor to perform the method of claim 1.

8. An apparatus with image transformation, comprising:
a processor configured to:
identify an original image; and
determine a transformed image by inputting the original image to a neural network model configured to transform a color of the original image,
wherein the neural network model comprises an operation block configured to perform white balancing on the original image using a convolution layer of a 1×1 kernel size, a correction block configured to correct a color of an output image of the operation block, and a mapping block comprising a plurality of residual blocks configured to apply a lookup table to an output image of the correction block.

9. The apparatus of claim 8, wherein the operation block comprises a depth-wise convolution layer, as the convolution layer, configured to perform white balancing through a channel-wise operation on a color of each of pixels comprised in the original image.

10. The apparatus of claim 8, wherein the correction block comprises a convolution layer configured to perform an operation on colors of pixels comprised in the output image of the operation block, a batch normalization layer configured to perform batch normalization on the output image of the operation block, and an activation layer configured to perform an activation function operation.

11. The apparatus of claim 8, wherein the plurality of residual blocks are configured to transform the color of the output image of the correction block based on a preset function of the neural network model by applying the lookup table to the output image of the correction block.

12. The apparatus of claim 8, wherein the processor is configured to:
generate a comparison image using a comparison model trained to generate an image the same as the original image from the transformed image; and
train the neural network model based on a difference between the original image and the comparison image,
wherein the comparison model is a deep learning model that is different from the neural network model and has a same structure as the neural network model.

13. The apparatus of claim 8, wherein the processor is configured to train the neural network model to generate the transformed image that is not discriminated by a discriminative model trained to discriminate an original image and a transformed image generated from the neural network model.

14. A method with image transformation, comprising:
generating, using a first generation model, a first transformed image based on a first original image;
generating, using a second generation model, a second transformed image based on the first transformed image; and
training the first generation model based on a reconstruction loss and an adversarial loss, where the reconstruction loss is determined between the first original image and the second transformed image, and the adversarial loss updates one or more parameters of the first generation model and is determined based on a difference in a brightness between a second original image and the first transformed image.

15. The method of claim 14, comprising training the second generation model based on another adversarial loss that is determined based on a difference between the first original image and the second transformed image.

* * * * *